Patented Dec. 16, 1952

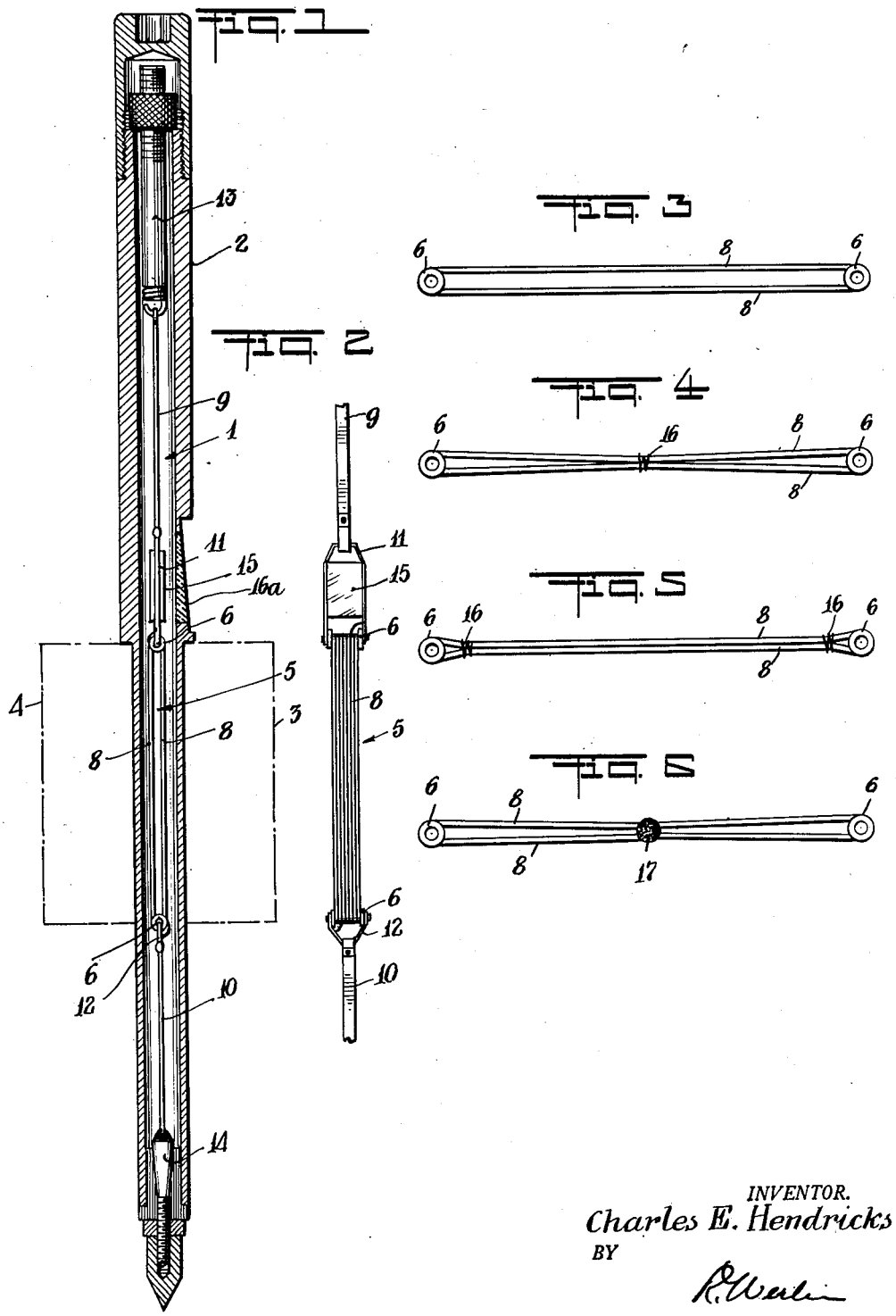

2,622,118

UNITED STATES PATENT OFFICE 2,622,118

GALVANOMETER WITH ADJUSTABLE DAMPING

Charles E. Hendricks, Tulsa, Okla., assignor to Century Geophysical Corporation, a corporation of Delaware Application December 16, 1950, Serial No. 201,140

6 Claims. (Cl. 171—95)

This invention relates to improvements in galvanometers of the moving coil or D'Arsonval type, and particularly methods and means for controlling the electrical damping characteristics of such galvanometers.

D'Arsonval type galvanometers are employed for various applications and in numerous types of instruments, such as seismograph oscillograph cameras, strain gauge circuits, etc. As is known, galvanometers must be electrically damped to prevent the vibratory assembly from acting as a torsional pendulum. Conventional systems for electrically damping such galvanometers is through the use of an external impedance shunted across the galvanometer and of such value as to provide the amount of damping required. Practically, this is made up of the impedance of the circuit in which the galvanometer is used and an extra impedance which, when added to that of the circuit, either as a shunt or series impedance, will allow the galvanometer to see the impedance required for the amount of damping required. This system of damping has a number of disadvantages, chief among them being the fact that the added impedance alters the characteristics of the circuit, in the case of a shunt impedance, or prevents the utilization of the full sensitivity of the galvanometer, in the case of a series impedance. In many applications it is desirable to use several galvanometers having differing frequency characteristics with the same external damping circuit. Present systems have heretofore been unable to accomplish this desirable objective without sacrifice in sensitivity or efficency of the galvanometer, particularly where it is sought to employ galvanometers of standardized design such as may be produced by mass production methods.

The present invention has for its principal object the provision of a moving coil galvanometer having unique features of construction which obviates the disadvantages noted above.

An important object is the provision of a moving coil galvanometer of standardized construction having means for varying the normal electrical damping characteristics thereof to match a given external circuit.

A further object is the provision of a galvanometer coil in which the normal geometry of the coil is modified to vary its damping characteristics.

There is sometimes used for comparing the performance of different galvanometers, a value known as the "figure of merit," which consists of the product of the D. C. sensitivity of the galvanometer times its natural frequency squared. The larger this "figure of merit," the more responsive is the galvanometer. Prior art systems of damping have always resulted, effectively, in the lowering of this "figure of merit." The present invention has for an additional object the provision of an arrangement for changing the damping requirements of a galvanometer without changing the "figure of merit."

Another object is the provision of a method for changing the damping characteristics of a galvanometer coil.

These and other more specific objects and advantages of this invention will become apparent from the following detailed description when read in conjunction with the accompanying drawings which illustrate several useful embodiments in accordance with this invention.

In the drawings:

Fig. 1 is a longitudinal sectional view of a generally standard form of moving coil type galvanometer;

Fig. 2 is an elevational front view of the vibratory assembly of the galvanometer shown in Fig. 1;

Fig. 3 is an edge view of the moving coil constructed in the standard shape shown in Figs. 1 and 2; and Figs. 4, 5, and 6 illustrate modified shapes of the moving coil employed in accomplishing the purposes of this invention.

Fig. 1 illustrates a more or less conventional form of D'Arsonval type galvanometer. This comprises a vibratory assembly designated by the numeral 1, which is adapted to be enclosed within a generally tubular barrel 2 constructed of a suitable non-magnetic material, such as brass, and adapted to be inserted between the pole-pieces, indicated generally at 3 and 4, of a suitable magnet, in a generally conventional manner. Vibratory assembly 1 includes a coil, indicated at 5, which is constructed of a suitable number of turns of very fine wire wound about a pair of non-conductor end spools 6—6, suitably spaced apart along the longitudinal axis of the vibratory assembly, so that the coil will have the elongated narrow shape shown in Fig. 1, in which the opposite side portions 8—8 of the coil will be in laterally spaced, substantially parallel relation and symmetrical with respect to the longitudinal axis of the coil.

Upper and lower suspension ribbons 9 and 10, respectively, constructed of a suitable flexible conducting metal, are connected to the opposite ends of coil 5 in any suitable manner, as by means of the metal links 11 and 12, respectively, the outer ends of the suspension ribbons being connected to upper and lower anchoring members 13 and 14, respectively, which are, in turn, connected to the opposite ends of barrel 2 whereby to anchor and suspend the vibratory assembly in the barrel. Anchoring members 13 and 14 are made adjustable to permit varying the tension on the vibratory assembly. A light reflecting mirror 15 is mounted in a suitable manner on upper suspension ribbon 9 opposite a light-transmitting window 16a arranged in the wall of barrel 2.

As noted previously, vibratory assembly 1 is of a generally conventional construction, coil 5 being of a shape and construction which lends itself readily to standardization for production by mass production methods and will be referred to for purposes of this description as the "normal" shape. A coil of such normal shape will have a particular radius of gyration and a corresponding moment of inertia, which will determine the natural frequency of the coil when mounted between appropriate suspension elements. Such a coil will, therefore, have predetermined damping resistance to achieve a given degree of damping.

In accordance with this invention, the damping characteristics of coil 5 may be modified to meet the requirements of any particular application by constricting the normal transverse dimension of the coil to an appropriate degree.

Fig. 3 illustrates a coil of the so-called "normal" shape corresponding to coil 5 of Figs. 1 and 2. Figs. 4, 5, and 6 illustrate several constricted shapes formed from the normal coil of Fig. 3 in accordance with this invention. The coil shape shown in Fig. 4 is obtained by wrapping fine aluminum wire 16, of generally the same character as that employed in the coil itself, about the opposite side portions 8—8 of the coil at about the mid-point thereof, in a manner to draw the side portions inwardly into contact with each other and symmetrically with respect to the axis of gyration of the coil. The coil shape shown in Fig. 5 is obtained by similarly constricting the coil at its opposite ends adjacent spools 6—6 so that the sides of the coil are brought into contact throughout substantially the entire length of the coil. In Fig. 6, the shape shown is obtained by partly constricting the opposite sides of the coil, at about the mid-point thereof, by placing the coil in a suitable jig or fixture (not shown) and, while holding the sides in the desired constricted relation, depositing a small body of a suitable hardenable cement 17 in the space between the constricted portions of the coil and about these portions of the coil, so that when the cement hardens it will permanently maintain the desired constricted shape of the coil.

It will be evident that the constriction of the coil in the several ways illustrated in Figs. 4, 5 and 6, necessarily changes the normal geometry of the coil symmetrically with respect to its axis of gyration in such a manner as to reduce the radius of gyration thereof. This will produce a reduction in the active moment of inertia of the coil, corresponding to the reduction in the radius of gyration as determined by the particular constricting arrangement employed. By adding suspension ribbons of appropriate restoring torque for the final shape of coil, the coil may be returned to its original frequency. If the vibratory assembly has been originally constructed so that the total "active" moment of inertia (that of the portion of the coil between the spools 6—6) is approximately equal to the total "inactive" or "dead" moment of inertia (that of the spools, coil ends, suspensions, mirror, etc.) the condition of maximum efficiency of the galvanometer—it will be found that the D. C. sensitivity will have varied little, if any, after constriction. The "figure of merit," described above will, therefore, also be substantially unchanged. The only significant change will be that the coil will now require less damping resistance to achieve a given degree of damping.

Table I, below, by way of illustration, gives the comparable values of the significant factors for the normal coil of Fig. 3 and the corresponding constricted coils illustrated in Figs. 4 and 6:

Table I

| Coil Shape | W | F | S | R |
|---|---|---|---|---|
| Fig. 3 | 0.027 | 100 | 48 | 129 |
| Fig. 4 | 0.014 | 100 | 46 | 42 |
| Fig. 6 | 0.023 | 100 | 48 | 97 |

$W$=mean width of coil—inches.
$F$=natural frequency—cycles per second.
$S$=D. C. sensitivity—inches/milliampere/15.5 inches.
$R$=damping resistance for .7 critical damping—ohms.

It will be obvious that there is almost an infinite number of degrees and forms of constriction possible with a coil of a particular original shape, thus permitting very accurate matching of the original coil to many specific applications. As a result of the constricting arrangement herein described, it will be seen that it is now possible to start with a coil of standardized shape and dimensions which may be produced in large quantities by mass production methods, and readily adapt such a standard coil for a multiplicity of applications without changing its sensitivity and without altering the external circuit in which it is inserted.

In summary, the constriction of the coil of a galvanometer movement, in accordance with this invention, permits varying the damping resistance required for a given degree of damping, without significantly varying the other characteristics of the galvanometer, thus permitting standardization in mass production.

It will be understood that various alterations and changes may be made in the details of the embodiments herein described without departing from the scope of the appended claims but within the spirit of this invention.

What I claim and desire to secure by Letters Patent is:

1. A galvanometer coil for a vibratory-type galvanometer comprising a pair of longitudinally spaced end members for connecting the ends of said coil to flexible suspension elements in a vibratory-type galvanometer to position said coil in the magnetic field of the galvanometer, a closed wire loop wound about said end members, the opposite side portions of said loop having an initial spaced apart relation, and, to reduce the radius of gyration of said coil in a galvanometer, constriction means engaging said opposite side portions between said end members to constrict said side portions inwardly with respect to said initial relation and symmetrically with respect to the axis of gyration of said coil when suspended between a pair of flexible suspension elements in the magnetic field of a vibratory-type galvanometer.

2. A galvanometer coil according to claim 1, wherein said constriction means engages said side portions at a point intermediate the ends thereof.

3. A galvanometer coil according to claim 1, wherein said constriction means engages said side portions at a point intermediate the ends thereof and constricts said side portions to positions intermediate their original positions and the axis of gyration of said coil.

4. A galvanometer coil according to claim 1, wherein said constriction means is applied to said side portions at a plurality of points to constrict said side portions into contact with each other substantially throughout their length.

5. A galvanometer coil according to claim 1, wherein said constriction means comprises a metallic wire which is wrapped around said opposite side portions.

6. A galvanometer coil according to claim 1, wherein said constriction means is a body of cementitious material.

CHARLES E. HENDRICKS.

REFERENCES CITED

The following references are of record in the file of this patent:

UNITED STATES PATENTS

| Number | Name | Date |
|---|---|---|
| 2,169,476 | Gill et al. | Aug. 15, 1939 |
| 2,267,955 | Squibb | Dec. 30, 1941 |
| 2,330,334 | Buckingham et al. | Sept. 28, 1943 |
| 2,519,591 | Morrow | Aug. 22, 1950 |